June 10, 1930.  J. B. COFFEY  1,762,327
SHAPING MACHINE FOR CANDY CANES AND THE LIKE
Filed Sept. 22, 1925  6 Sheets-Sheet 1

Inventor
J.B.Coffey

June 10, 1930.  J. B. COFFEY  1,762,327
SHAPING MACHINE FOR CANDY CANES AND THE LIKE
Filed Sept. 22, 1925   6 Sheets-Sheet 3

June 10, 1930.                J. B. COFFEY                1,762,327
            SHAPING MACHINE FOR CANDY CANES AND THE LIKE
                    Filed Sept. 22, 1925        6 Sheets-Sheet 5

Inventor
J. B. Coffey.
By
Attorney

June 10, 1930. J. B. COFFEY 1,762,327
SHAPING MACHINE FOR CANDY CANES AND THE LIKE
Filed Sept. 22, 1925 6 Sheets-Sheet 6
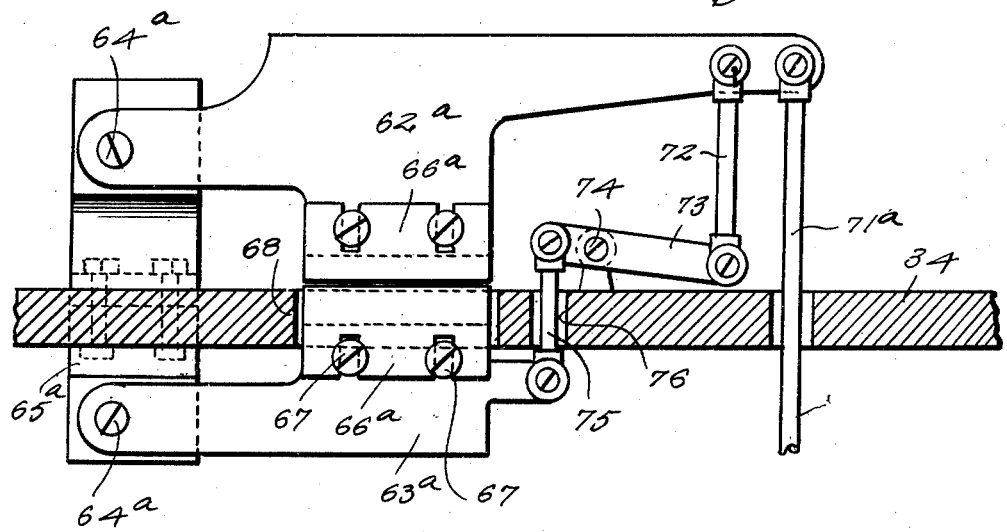
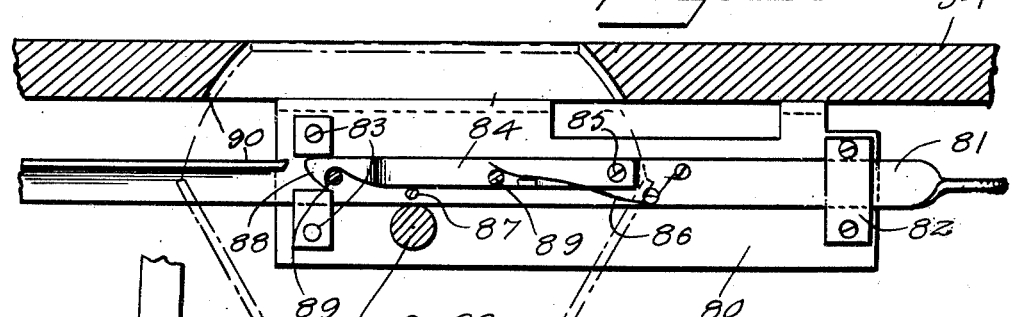
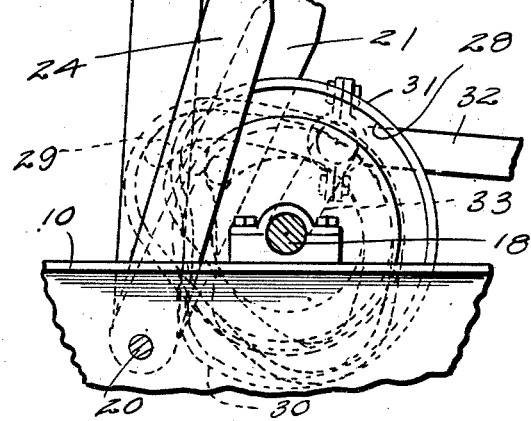
Inventor
J. B. Coffey.
By
Attorney Patented June 10, 1930

1,762,327

UNITED STATES PATENT OFFICE

JOHN B. COFFEY, OF NASHVILLE, TENNESSEE, ASSIGNOR TO BUNTE BROTHERS, OF CHICAGO, ILLINOIS, A CORPORATION OF ILLINOIS

SHAPING MACHINE FOR CANDY CANES AND THE LIKE

Application filed September 22, 1925. Serial No. 57,897.

This invention relates to a machine adapted to shape plastic candy or other material into canes or other approved shapes.

It is aimed to provide a novel, inexpensive, compact and efficient machine adapted to carry out the aforesaid purpose.

It is generally aimed to provide a structure wherein all of the various mechanisms are operated from a common source of power and which includes a novel feeding mechanism, novel cutting mechanism, a novel shaping mechanism, and a novel discharge mechanism.

The more specific objects will become apparent if not pointed out specifically in connection with the following description taken with accompanying drawings illustrating one operative embodiment.

In said drawings:—

Figure 7 is an enlarged view, fragmentarily taken, showing the arrangement of the cam and associated parts;

Figure 8 is a detail sectional view taken on the line 8—8 of Figure 1;

Figure 9 is a sectional view taken on the line 9—9 of Figure 3 but including the table; and Figures 10 and 11 are detail views in elevation and section, respectively, of parts of the chain drive for the feeding mechanism.

Figure 1:
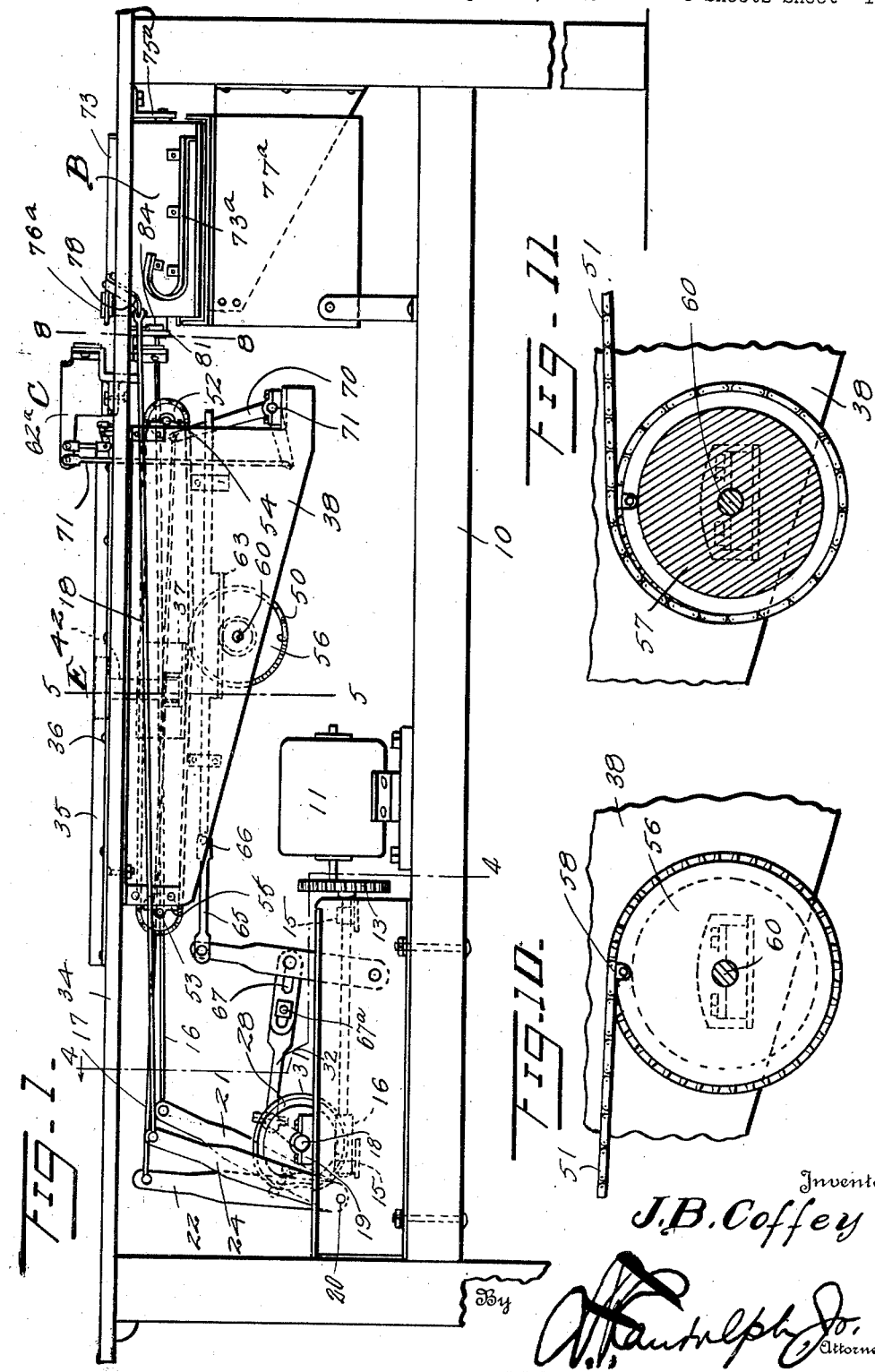
Figure 1 is a view of the machine in side elevation.
Figure 2:
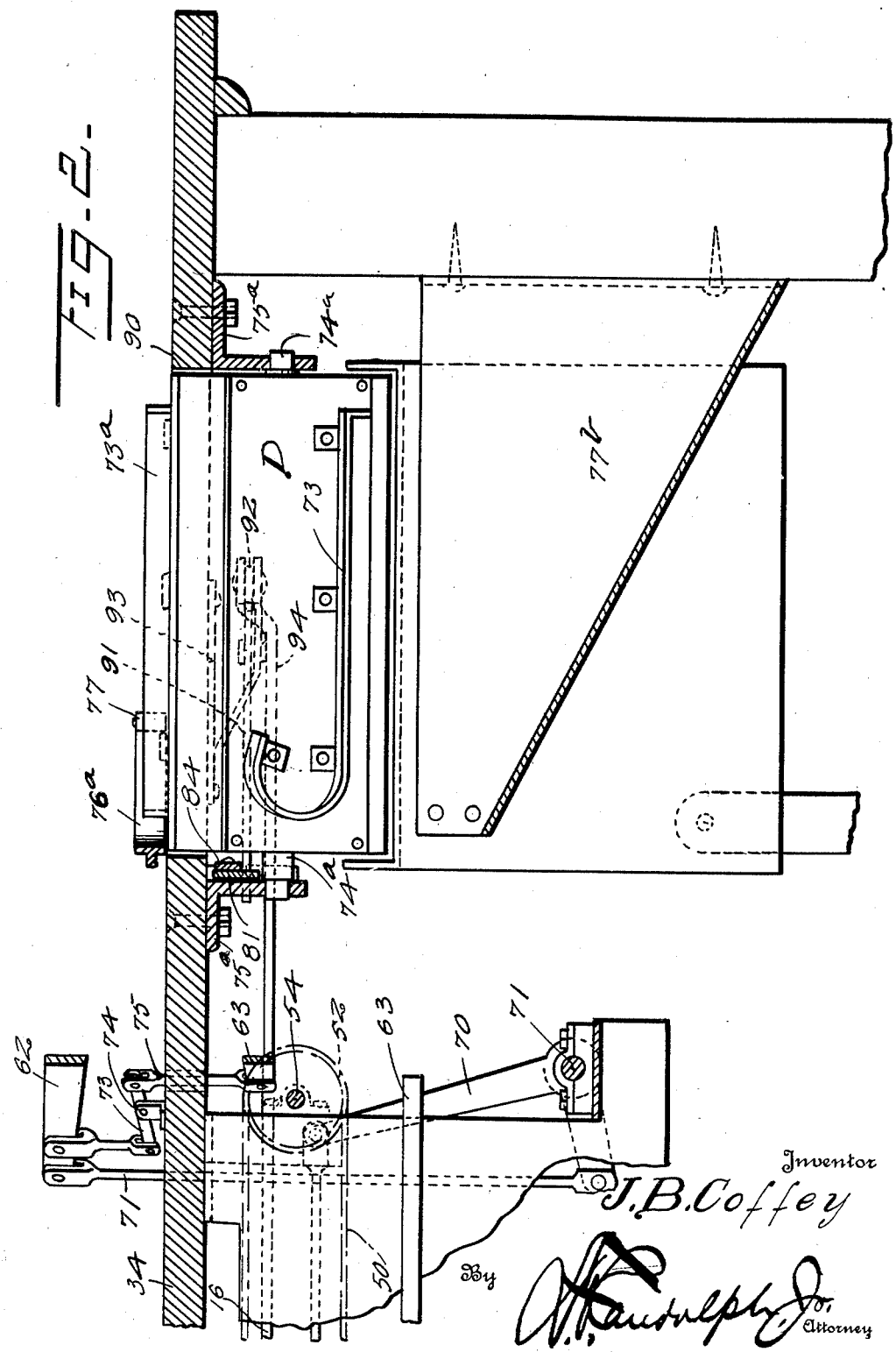
Figure 2 is a view of the machine, fragmentarily and on an enlarged scale, in section taken longitudinally through the machine and adjacent the discharge drum.

Referring specifically to the drawings, a suitably mounted framework is provided as at 10, on which as best shown in Figure 1, an electric motor 11 is mounted. This electric motor constitutes the prime mover for the machine but it is to be understood that any other source of power may be substituted if desired. The main shaft of motor 11 has a pinion 12 thereon which is in mesh with and drives a gear wheel 13 keyed to a shaft 14 journaled in bearings 15 on the frame 10. A worm 16 is keyed to shaft 14 and is in mesh with and drives a worm wheel 17 carried by a countershaft 18 which is disposed transversely of the frame and journaled in suitable bearings 19 thereon. Below the shaft 18 is a rod 20 and pivotally connected thereto are operating levers 21, 22, 23 and 24, respectively. The levers 21, 22 and 24 carry rollers or other projections as at 25 which are adapted for disposition in cam grooves 26, 27 and 28, respectively, of cams 29, 30, and 31 keyed to the shaft 18 so that the levers 21, 22 and 24 will be rocked during operation of the machine in proper sequence so that the lever 21 may operate a cane supporting and discharge drum B; the lever 22 may operate a cutting mechanism C; the lever 24 may operate a shaping mechanism D. Lever 23 is bifurcated and is connected in any suitable manner as by a strap 32, to a crank 33 of the shaft 18. The lever 23 is adapted to be rocked like the other levers and it operates a feed mechanism as at E.

The supporting frame or structure 10 particularly includes a table or top as at 34 over which a plastic strip of candy or material to be molded is adapted to be passed, usually guided by hand, between upright guides 35, preferably elongated in form and fastened as at 36 to the top of said table. The strip of candy is suggested in dotted lines as at F in Figure 5 and after being fed forward to the proper extent by the feeding mechanism E, it is severed into a proper length by the cutting mechanism C in order to be shaped into a cane by the drum B and coacting shaping means.

Figure 5:
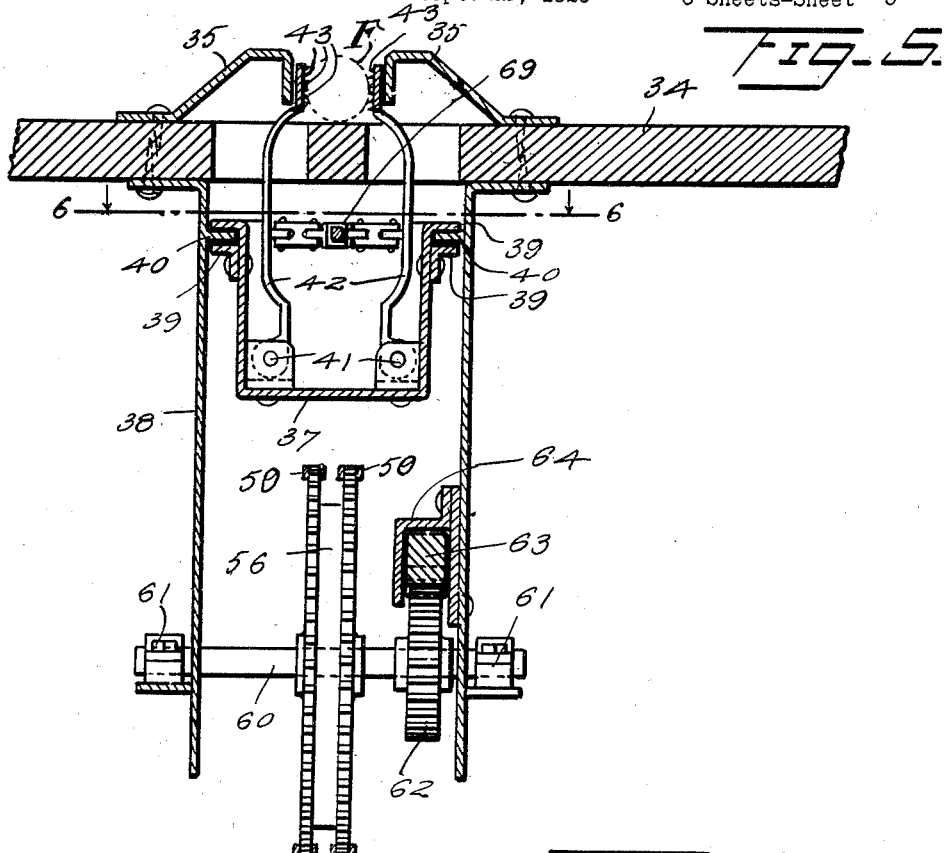
Figure 5 is a detail sectional view taken on the line 5—5 of Figure 1.
Figure 6:
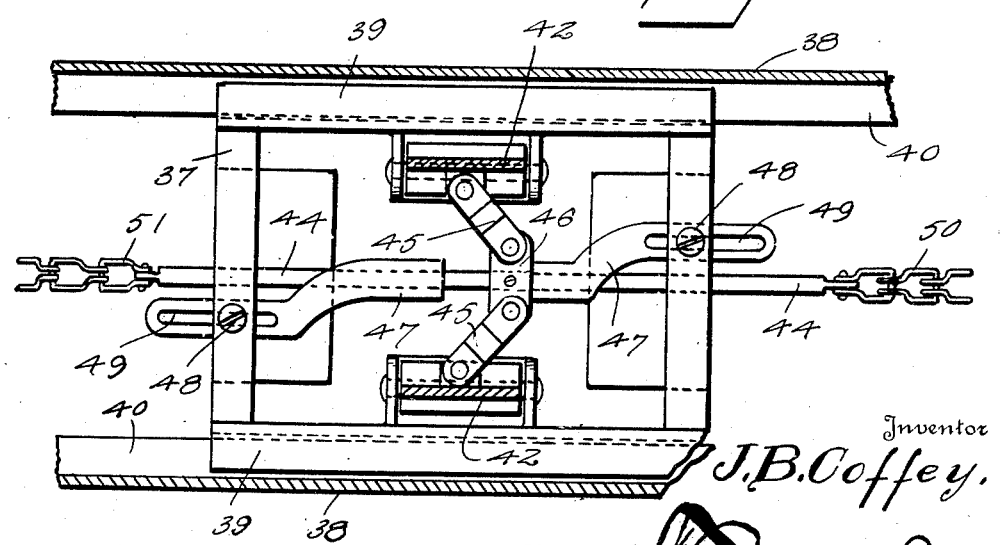
Figure 6 is a detail sectional view taken on the line 6—6 of Figure 5.

Reverting to said feeding mechanism E and with particular reference to Figures 5 and 6, a carriage 37 is provided adapted to travel longitudinally of the machine between depending plates 38 fastened to the table. Said carriage has outwardly extending flanges 39 and bars 38, disposed on opposite sides of tracks 40 extending inwardly from the plates 38. Pivoted as at 41 to the carriage 37 adjacent its base, are two upright gripper arms 42 whose upper ends are disposed between the guides 35 and which have spurs 43 adapted to penetrate the candy strip as shown in Figure 5. On the forward movement of the carriage 37, the grippers 42 are adapted to engage the strip F and advance it but on the return movement of the carriage, is adapted to automatically disengage such candy. To this end, a rod 44 is slidably connected to the carriage 37 and is movable longitudinally thereof to a limited extent.

Pivotally fastened to the grippers 42 are toggle links 45 in turn pivoted to a connecting link 46 which is rigidly fastened to the rod 44. Due to the presence of toggle links 45, they cause the spur ends or jaws to move toward each other on the forward movement of rod 44 and to move apart or spread on the rearward movement of such rod. Stop arms 47 are adjustably fastened to the carriage 37 by means of bolts 48 and elongated slots 49. These arms are in the path of movement of the link 46 and serve to limit the movement of such link and of the grippers, and at the same time permit the movement of the link and grippers to be adjusted. Chain links 50 and 51 are connected to the opposite ends of the rods 44 and respectively pass over idle sprocket wheels 52 and 53 mounted on shafts 54 and 55 journaled on the walls 38 in any suitable manner. The inner ends of said chains are operatively fastened to and trained over sprocket wheels or a single sprocket wheel having two sets of teeth as at 56 and 57, the connection being made at 58 and 59, respectively. The sprocket wheel 56—57 is carried by a shaft 60 suitably journaled on the frame 10 for instance in the walls 38 and in bearings 61 on the frame. Shaft 60 carries a pinion 62 which is in mesh with the teeth of a rack bar 63 slidable along the inner surface of one of the plates 53 positioned and guided by brackets 64 secured thereto. A short pitman or link 65 is pivoted to the rack bar 63 as at 66 and in turn has a lever 67 pivoted to lever 23. The connection or strap 32 may be in relatively adjustable sections as shown in Figure 1, connected together by a bolt $67^a$ so that the length of the connection may be varied. It will thus be seen that as the shaft 18 rotates, it reciprocates the strap 32, lever 23, link 65 and rack bar 63, causing it to rotate gear wheel 62, shaft 60, sprocket wheels 56 and in turn alternatively wind and unwind the chain sections at 50 and 51, thus alternately gripping the strip of candy and advancing it a predetermined length, then releasing it and returning to normal position to reengage the strip to advance it a predetermined distance, equivalent to the length of a candy cane.

Figure 3:
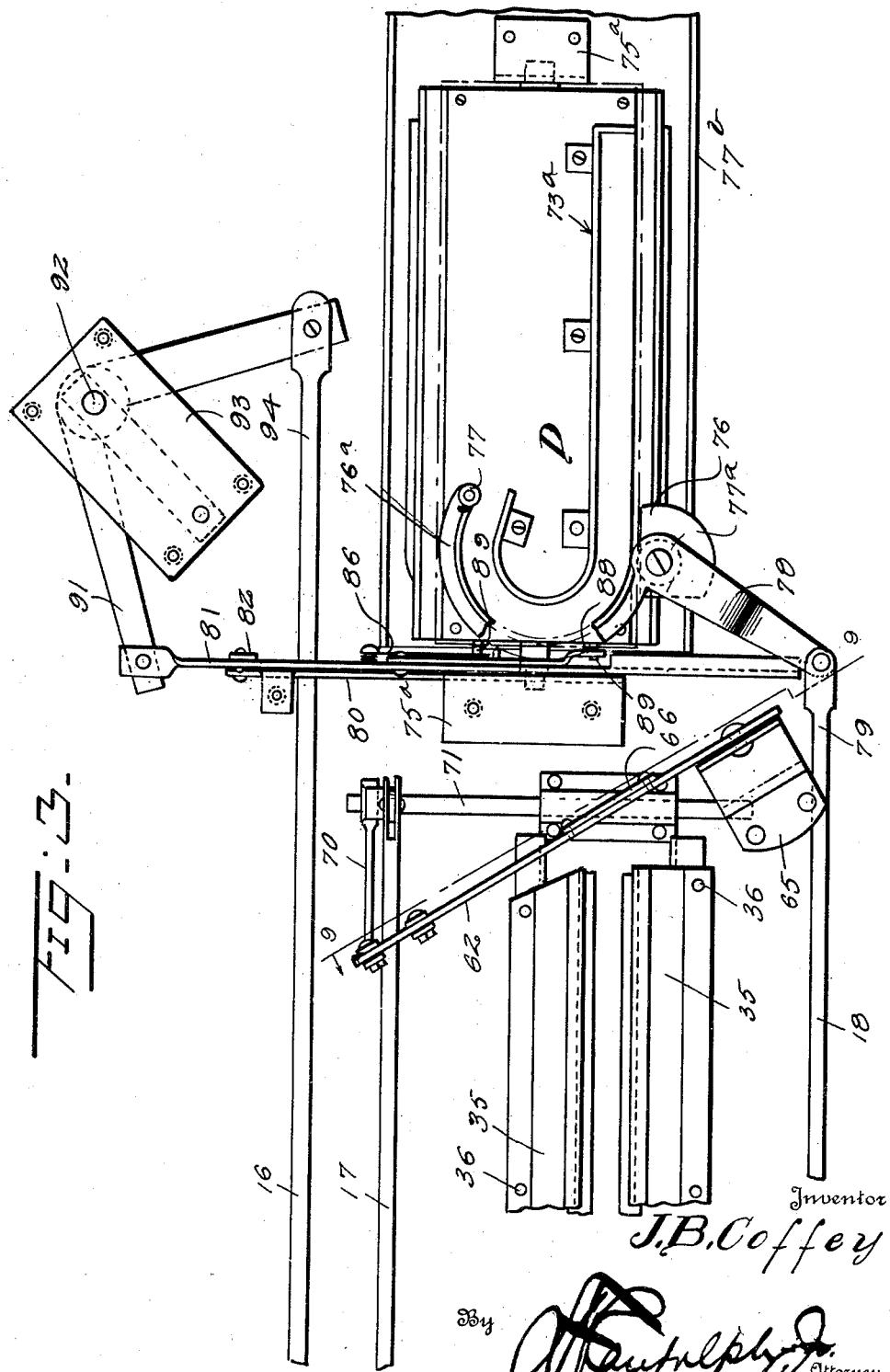
Figure 3 is a fragmentary view in plan, with the table removed so as to disclose the details.
Figure 4:
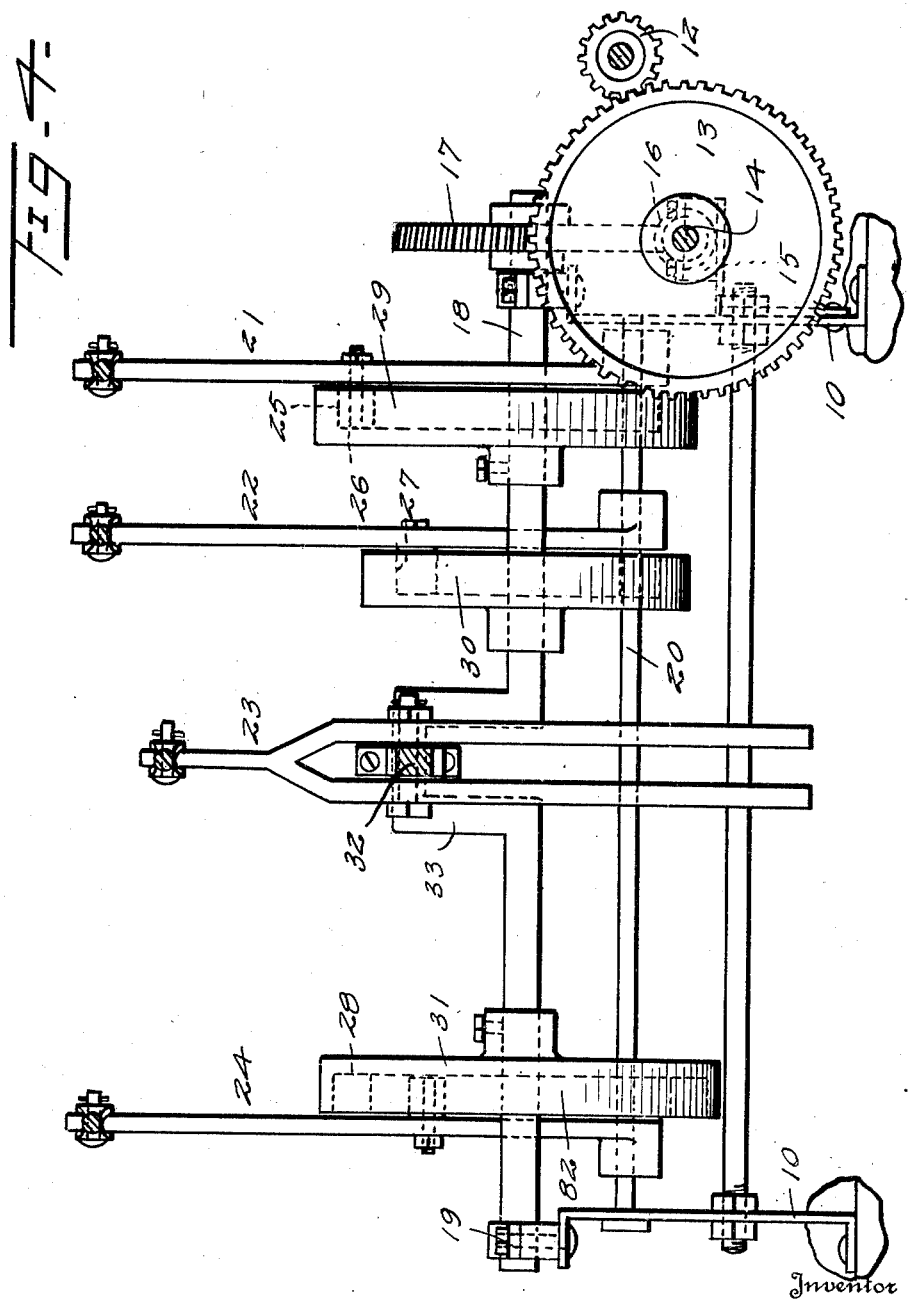
Figure 4 is a detail sectional view taken on the line 4—4 of Figure 1.

When the carriage 37 has advanced forwardly to the maximum extent, which determines the length of the cane, the cutting mechanism C comes into play. This mechanism is detailed in Figure 9 and consists of knives $62^a$ and $63^a$ movable toward and away from each other to cut the material and render the path of its movement unobstructed. The knives $62^a$ and $63^a$ are pivoted as at $64^a$ to brackets $65^a$ fastened to the table 34, one above and one below the same. Each of the knives $62^a$ carries adjustable blades $66^a$ which are adjustably fastened as at $67^b$ to the knives. To accommodate movement of the knives, the table has a slot or recess 68 therethrough. In order to operate the cutting mechanism a rod $68^a$ is pivotally connected to the lever 10 and in turn pivotally connected to one arm of a bell crank lever 70 having a stud as at 71 suitably journaled on one or both of the plates 38 as best shown in Figure 1. The other arm of the bell crank lever 70 has a rod or link $71^a$ pivoted thereto and in turn pivoted to the knife $62^a$. A link 72 is pivoted to the knife $62^a$ and to a bar or lever 73 pivoted intermediate its ends at 74 to the table 34. The other end of the lever 73 is pivoted to a short link 75 passing freely through an opening 76 of the table and below the same being pivotally connected to the knife $63^a$. As a result, through the operation of shaft 18, the lever 10 reciprocates rod 68 so that the same rocks the bell crank lever 70, imparts motion to the rod 71, and causes the latter to raise and lower the knife $62^a$, thus swinging it on its pivot, and through the connections 72, 73 and 75, causing the blade or knife $63^a$ to coact therewith in scissor blade fashion, so as to sever the candy from the plastic strip and thereafter move out of the path of advance of such candy. The candy strip F before being cut into desired length for the cane is fed or advanced onto the rotary drum B. This drum has three or more similar surfaces on each of which is a shaping wall $73^a$. The drum has trunnions $74^a$ which are journaled in suitable bearings $75^a$ on the framework 10. Granting that one of the surfaces of the drum then is in operative position as shown in the drawings, the cut length of the plastic candy is located opposite to the wall $73^a$. Such wall it will be realized is of cane shape. Coacting with said wall is a shaping lever or member $76^a$ also of cane shape. This shaping lever $76^a$ is normally out of the path of advance of the candy but after the candy has been cut, the shaping member $76^a$ is forced or moved into the position shown in Figure 3 so that in combination with the wall $73^a$ the necessary shape will be imparted to the cut length of candy. On the end of the shaper 76ª which first engages the candy, a rotatable roller 77 is provided which is preferably concave to conform to the surface of the candy which it engages and shapes or curls about the wall 73ª. The shaper 76ª has an offset lug 77ª to which an arm 78 is fastened which has a rod 79 pivoted thereto and in turn pivoted to lever 11 so that at the proper sequence of operation said lever 11, rod 18, link 88 will move the shaper 76ª into engagement with the cut length of candy, thus shaping it in combination with the wall 73ª, after which the parts aforesaid including the shaper 76ª will be retracted for the succeeding operation. At the same time, the drum B is rotated to bring the feeding plates thereof into operative position, and in this way, as the faces assume different positions, the candy cane soon becomes lowermost and will fall from the drum into a hopper or chute 77ᵇ fastened to the frame 10 below the same and adapted to lead to a suitable box or receptacle heated if desired by manual labor so as to avoid breakage and to facilitate proper packing. To this end, a bracket 80 is fastened to the under surface of the table, being disposed transversely of the machine and having a bar 81 movable longitudinally across one face thereof, guided by a cleat 82 and a pair of separated cleats 83 fastened to said bracket. Bar 81 has a hook lever 84 pivoted thereto at 85 and urged to a normal position by a spring 86, to maintain it in contact with a stop 87 on the bar. The distal end of the lever 84 is a hook 88 adapted to successively engage three offset pins 89 at the adjacent end of the drum, such pins being intermittently spaced and corresponding one to each of the operative faces of the drum. Thus, with reference to Figure 8, as the bar 81 slides to the right, it will through the engagement of hook 88 with one of the pins 89 rotate the drum one-third of a revolution, after which the machine operates to restore the bar 81 to normal position and into reengagement with the next lug 89. The bar 81 has a free end portion 90 adapted to coact with the cleat 83 to form a lock when the drum is not being turned, in order to prevent improper operation thereof. The bar 81 has a bell crank lever 91 pivoted thereto, as best shown in Figure 3 and which lever in turn is pivoted at 92 to a suitable plate or other support 93 on the frame 10. The other arm of lever 91 has a rod 94 pivotally connected thereto and also pivotally connected to the lever 21 for operation.

As the result it will be seen that a cycle of operation of the machine includes the feeding of the candy strip or strips in a plastic state, forwardly by the grippers 42, succeeded by severance of the proper length of candy by knives 62ª and 63ª, further succeeded by the shaping of the cut length about the wall 73ª by the shaper 76ª, and still further succeeded by rotation of the drum, through succeeding operations of the machine, so that the cane will eventually be in a position where it will fall into the hopper 17 so that the same may slide into a receptacle or so that it may be engaged manually for removal.

Various changes may be resorted to provided they fall within the spirit and scope of the invention.

I claim as my invention:—

1. A machine of the class described having gripping members adapted to engage the material, movable elements, means to actuate the elements to move the grippers into and out of engagement with the material, means to move the gripping members bodily so as to convey the material including flexible members, and drum means alternately turnable in opposite directions, said flexible members being connected to said drum means.

2. A machine of the class described having a frame, a carriage mounted thereon, material gripping means carried by the carriage, and a reciprocatory operating means to move the gripping means into and out of engagement with the material, said reciprocatory operating means embodying mechanism operable to slide the carriage to control the feed of the material, and stop members to control the extent of movement of the carriage.

3. A machine of the class described having a table provided with guide members for the material to be shaped, depending plates on said table, a carriage slidable between said plates, grippers pivoted to said carriage having their free ends disposed between said guides for the purpose specified, a rod movable independently of the carriage, means on the carriage to limit movement of said rod, a connecting link on said rod engageable with said means, and toggles connecting said connecting link and said grippers.

4. A machine of the class described having gripping and advancing mechanism for the material, flexible elements connected to said mechanism, a gear member, means to operate said gear member alternately in opposite directions, and said flexible members being connected to said gear member.

5. A machine of the class described having a drum provided with a plurality of operative faces, material shaping means on each face, a material shaping member common to said means, means to operate said member, a bar, a hook lever pivoted to said bar, said drum having projections one for each operative face thereof engageable by the hook lever to rotate the drum, cleats, and a lock member carried by said bar coacting with said cleats for the purpose specified.

6. In a candy forming machine, means for receiving a strip of candy, means for forming a crook adjacent one end of a strip on said receiving means, and means for tilting the strip receiving means to effect the displacement of the candy strip therefrom.

7. In a candy forming machine, a strip receiving means, a candy forming mechanism having means for severing a section from a strip on the receiving means and means for forming a crook adjacent one end of the severed section, means for causing the tilting of the strip receiving means to effect the displacement of a strip therefrom, and means for causing the actuation of the severing, crook forming, and tilting means in proper timed relation.

8. In a candy forming machine, tiltable means for receiving a strip of candy, means associated with said receiving means for forming a crook adjacent one end of said strip on said receiving means, and means for intermittently tilting the strip receiving means to effect the intermittent displacement of candy therefrom.

9. In a candy forming machine, a strip receiving means, strip forming means carried by said receiving means, means cooperating with said forming means for forming a crook adjacent one extremity of a strip on said receiving means, and means for tilting said receiving means to effect the displacement of the strip from said forming means.

10. In a candy forming machine, rotary means for receiving a strip of candy, means for forming a crook adjacent one end of a strip on said rotary receiving means, and means for rotating said strip receiving means to effect the displacement of candy therefrom.

11. In a candy forming machine, a rotary strip receiving means, means for forming a crook adjacent one end of a strip on said receiving means, means for rotating said receiving means to effect the displacement of the candy strip therefrom, and guiding means for receiving said candy as it is displaced from the receiving means.

12. In a candy forming machine, a rotary device having a plurality of strip receiving surfaces disposed about the axis thereof, means for forming a crook adjacent one end of the strip associated with one of said surfaces, and means for rotating said strip receiving means to successively bring said surfaces into position to receive a strip and to effect the tilting of said surfaces for discharging the strip therefrom.

13. In a candy forming machine, a strip receiving mechanism comprising a plurality of tiltable strip receiving surfaces successively movable into position for receiving a strip of candy, means for forming a crook adjacent one end of the strip received by one of said surfaces, and means for moving said surfaces to their tilted position to effect the discharge of the strip therefrom.

In testimony whereof I affix my signature.

JOHN B. COFFEY.